United States Patent
Rawat et al.

(10) Patent No.: US 8,890,921 B2
(45) Date of Patent: Nov. 18, 2014

(54) SUPPORTING CONTINUATION OF A DATA SESSION AFTER PERFORMANCE OF A CIRCUIT SWITCHED FALLBACK PROCEDURE

(71) Applicant: Apple Inc., Cupertino, CA (US)

(72) Inventors: Naveen Rawat, Cupertino, CA (US); Mohan Rao Thota, Sunnyvale, CA (US)

(*) Notice: Subject to any disclaimer, the term of this patent is extended or adjusted under 35 U.S.C. 154(b) by 81 days.

(21) Appl. No.: 13/633,047

(22) Filed: Oct. 1, 2012

(65) Prior Publication Data

US 2013/0328996 A1 Dec. 12, 2013

Related U.S. Application Data

(60) Provisional application No. 61/657,713, filed on Jun. 8, 2012, provisional application No. 61/657,719, filed on Jun. 8, 2012.

(51) Int. Cl.
*H04N 7/14* (2006.01)
*H04W 36/30* (2009.01)

(52) U.S. Cl.
CPC *H04N 7/14* (2013.01); *H04W 36/30* (2013.01)
USPC ................................................... 348/14.02

(58) Field of Classification Search
CPC ................................................... H04W 36/30
USPC ................................ 348/14.02; 370/331, 332
See application file for complete search history.

(56) References Cited

U.S. PATENT DOCUMENTS

| | | |
|---|---|---|
| 2011/0222509 A1 | 9/2011 | Lee |
| 2011/0274038 A1 | 11/2011 | Zhu et al. |
| 2012/0002614 A1* | 1/2012 | Ekici et al. ............. 370/329 |
| 2012/0044868 A1 | 2/2012 | Faccin et al. |
| 2012/0069817 A1 | 3/2012 | Ling et al. |
| 2012/0177089 A1* | 7/2012 | Pelletier et al. ............ 375/219 |
| 2012/0264442 A1* | 10/2012 | Gerstenberger et al. ...... 455/450 |
| 2013/0070728 A1* | 3/2013 | Umatt et al. ............. 370/331 |
| 2013/0343347 A1* | 12/2013 | Andre-Jonsson et al. .... 370/332 |

FOREIGN PATENT DOCUMENTS

WO 2011163408 A1 12/2011

OTHER PUBLICATIONS

Apostolis K. Salkintzis et al., Abstract, "Voice Call Handover Mechanisms in Next-Generation 3GPP Systems," IEEE Communications Magazine, Feb. 2009, p. 46, right col., lines 22-34; Figs. 3-4.
International Search Report and Written Opinion for PCT Application No. PCT/US2013/040816, dated Jul. 26, 2013.

* cited by examiner

*Primary Examiner* — Stella Woo
(74) *Attorney, Agent, or Firm* — Womble Carlyle Sandridge & Rice LLP

(57) ABSTRACT

A method of supporting continuation of a data session at a wireless communication device after performance of a circuit switched fallback (CSFB) procedure is provided. The method can include establishing a data session while connected to a first network and determining an initiation of a voice call while the data session is ongoing over the first network. The method can further include participating in a CSFB procedure to transition from the first network to a second network in response to initiation of the voice call. After termination of the voice call, the method can additionally include determining that sufficient resources are not available to the wireless communication device on the second network to support a minimum threshold throughput for the data session. The method can also include reverting to the first network in response to determining that sufficient resources are not available to support the minimum threshold throughput.

24 Claims, 6 Drawing Sheets

SUPPORTING CONTINUATION OF A DATA SESSION AFTER PERFORMANCE OF A CIRCUIT SWITCHED FALLBACK PROCEDURE

CROSS-REFERENCE TO RELATED APPLICATIONS

This application claims priority to both U.S. Provisional Patent Application No. 61/657,713, filed on Jun. 8, 2012, and U.S. Provisional Patent Application No. 61/657,719, filed on Jun. 8, 2012, the contents of both of which are incorporated herein in their entirety by reference.

FIELD OF THE DESCRIBED EMBODIMENTS

The described embodiments relate generally to wireless communications and more particularly to supporting continuation of a data session after performance of a circuit switched fallback procedure.

BACKGROUND

Cellular networks using newer radio access technology (RAT) systems, such as Long Term Evolution (LTE) systems, are being developed and deployed. Networks using these newer RATs often support faster data rates than networks utilizing legacy RATs, such as second generation (2G) and third generation (3G) RATs, including Universal Mobile Telecommunications System (UMTS) networks and Global System for Mobile Communications (GSM) networks. However, in some deployments, LTE and other new RATs may not fully support some services that can be handled by legacy networks. Accordingly, LTE networks are often co-deployed in overlapping regions with legacy networks and wireless communication devices may transition between RATs as services or coverage may require. For example, in some deployments, LTE networks are not capable of supporting voice calls. Accordingly, when a wireless communication device receives or initiates a voice call while connected to a network that supports data sessions, but not voice calls, the wireless communication device can perform a circuit switched fallback (CSFB) procedure to transition to a legacy network that supports voice calls.

As a result of performance of a CSFB procedure, any ongoing data sessions that were established over a network offering faster data rates will be transferred to a legacy network having lower data rates. In some cases, a mobile device can remain on a legacy network subsequent to performance of a CSFB procedure even after the voice call for which the CSFB procedure was performed has terminated. Accordingly, the data session, if still ongoing, can continue to suffer slow and, in some cases, inadequate data rates. If data rates are so slow on the legacy network as to result in an inadequate level of throughput, the data session can even be dropped. Accordingly, users can experience poor performance and dropped data sessions subsequent to performance of CSFB procedures.

SUMMARY OF THE DESCRIBED EMBODIMENTS

Some embodiments disclosed herein provide for supporting continuation of a data session after performance of a CSFB procedure. In this regard, a wireless communication device in accordance with some example embodiments can determine for a data session that was transferred from a first network to a legacy network having slower data rates as a result of a CSFB procedure whether sufficient resources are available to the wireless communication device on the legacy network to support a minimum threshold throughput for the data session subsequent to termination of the voice call for which the CSFB procedure was performed. The minimum threshold throughput can, for example, be defined as a minimum throughput sufficient to support the data session without the data session being dropped. If sufficient resources are not available, then the wireless communication device of such embodiments can revert to the first network and resume the data session over the first network. Accordingly, embodiments described herein can provide for a better user experience by providing for faster data rates for data sessions after performance of a CSFB procedure and, in some instances, can reduce the incidence of dropped data sessions that otherwise might result from insufficient throughput on legacy networks.

In a first embodiment, a method for supporting continuation of a data session at a wireless communication device after performance of a CSFB procedure is provided. The method of the first embodiment can include establishing a data session while connected to a first network; determining an initiation of a voice call while the data session is ongoing over the first network; participating in a CSFB procedure to transition from the first network to a second network in response to initiation of the voice call; determining that the voice call has terminated; after termination of the voice call, determining that sufficient resources are not available to the wireless communication device on the second network to support a minimum threshold throughput for the data session; and reverting to the first network in response to determining that sufficient resources are not available to support the minimum threshold throughput.

In a second embodiment, a wireless communication device is provided. The wireless communication device of the second embodiment can include at least one transceiver and processing circuitry coupled to the at least one transceiver. The at least one transceiver can be configured to transmit data to and receive data from a first network and a second network. The processing circuitry can be configured to control the wireless communication device to at least establish a data session while the wireless communication device is connected to the first network; determine an initiation of a voice call while the data session is ongoing over the first network; participate in a CSFB procedure to transition from the first network to a second network in response to initiation of the voice call; determine that the voice call has terminated; after termination of the voice call, determine whether sufficient resources are available to the wireless communication device on the second network to support a minimum threshold throughput for the data session; revert to the first network in an instance in which it is determined that sufficient resources are not available to support the minimum threshold throughput; and remain connected to the second network in an instance in which it is determined that sufficient resources are available to support the minimum threshold throughput.

In a third embodiment, a computer program product is provided. The computer program product of the third embodiment can include at least one non-transitory computer readable storage medium having program code stored thereon. The program code can include program code for establishing a data session while connected to a first network; program code for determining an initiation of a voice call while the data session is ongoing over the first network; program code for participating in a CSFB procedure to transition from the first network to a second network in response to initiation of the voice call; program code for determining that the voice call has terminated; program code for determining, after termination of the voice call, whether sufficient resources are available to the wireless communication device on the second network to support a minimum threshold throughput for the data session; program code for reverting to the first network in an instance in which it is determined that sufficient resources are not available to support the minimum threshold throughput; and program code for remaining connected to the second network in an instance in which it is determined that sufficient resources are available to support the minimum threshold throughput.

In a fourth embodiment, an apparatus is provided that can include means for establishing a data session while connected to a first network; means for determining an initiation of a voice call while the data session is ongoing over the first network; means for participating in a CSFB procedure to transition from the first network to a second network in response to initiation of the voice call; means for determining that the voice call has terminated; means for, after termination of the voice call, determining that sufficient resources are not available to the wireless communication device on the second network to support a minimum threshold throughput for the data session; and means for reverting to the first network in response to determining that sufficient resources are not available to support the minimum threshold throughput.

In a fifth embodiment, an apparatus including processing circuitry is provided. The processing circuitry can be configured to determine that a voice call for which a CSFB procedure had been performed to transition the wireless communication device from a first network to a second network has terminated; determine, after termination of the call, whether sufficient resources are available to the wireless communication device on the second network to support a minimum threshold throughput for a data session that was first established on the first network prior to performance of the CSFB procedure; and control the wireless communication device to revert to the first network and resume the data session over the first network in an instance in which it is determined that sufficient resources are not available to support the minimum threshold throughput.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the invention in any way. Other embodiments, aspects, and advantages of the invention will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings are not necessarily drawn to scale, and in no way limit any changes in form and detail that may be made to the described embodiments by one skilled in the art without departing from the spirit and scope of the described embodiments.

DETAILED DESCRIPTION OF SELECTED EMBODIMENTS

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Some embodiments disclosed herein provide for supporting continuation of a data session after performance of a CSFB procedure. In this regard, a wireless communication device in accordance with some example embodiments can establish a data session while connected to a first network that may offer faster data rates than a legacy network. As a result of initiation of a voice call, the wireless communication device can participate in a CSFB procedure and transition to a legacy network that supports circuit switched (CS) voice calls in response to the voice call. As a result, the data session can be moved to the legacy network, which has slower data rates. In a situation in which the data session is still ongoing after termination of the voice call, the wireless communication device of some example embodiments can determine whether sufficient resources are available to the wireless communication device on the legacy network to support a minimum threshold throughput for the data session. If it is determined that sufficient resources are not available, the wireless communication device of such embodiments can revert back to the first network and resume the data session over the first network. Accordingly, embodiments described further herein below can provide for a better user experience by providing for faster data rates for data sessions after performance of a CSFB procedure and, in some instances, can reduce the incidence of dropped data sessions that otherwise might result from insufficient throughput on legacy networks.

Figure 1:
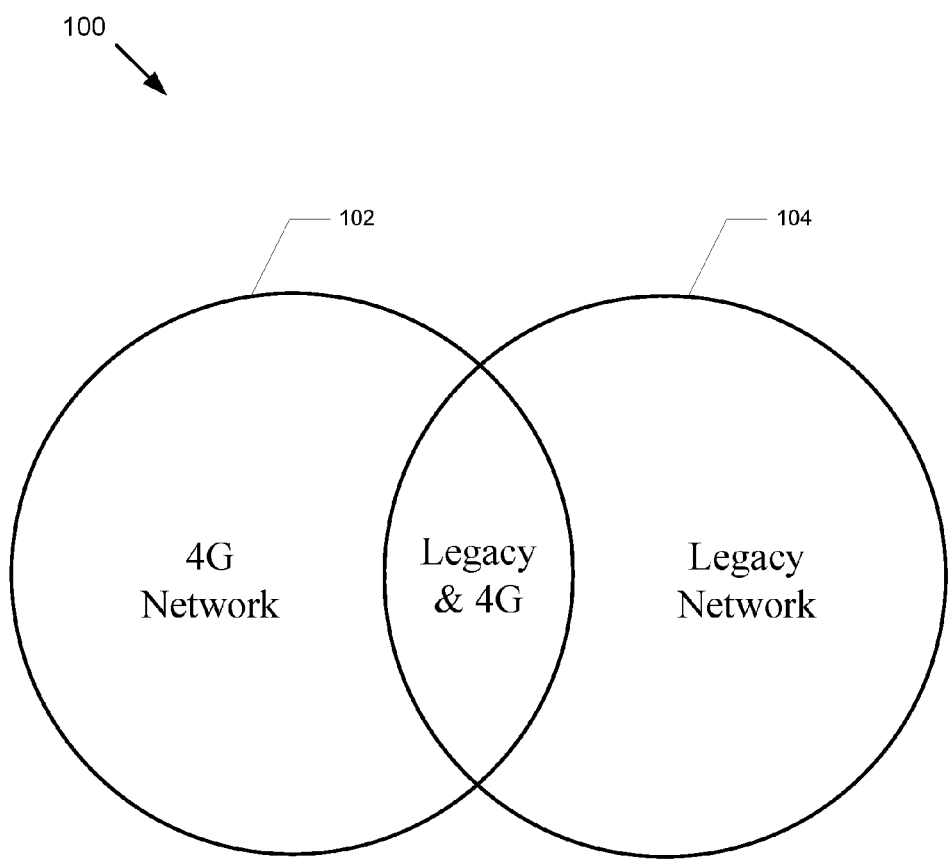
FIG. 1 illustrates overlapping coverage of a fourth generation network and a legacy network in accordance with some example embodiments.

FIG. 1 illustrates overlapping coverage of a fourth generation (4G) network 102 and a legacy network 104 in a communications system 100 in accordance with some example embodiments. The 4G network 102 can, for example, be an LTE network or other network that can offer faster data rates than legacy networks, such as 2G and 3G networks, but may not support voice calls. It will be appreciated that the 4G network is illustrated by way of example, and not by way of limitation. In this regard, other networks in existence now or that may be developed in the future that offer higher data rates but that do not support CS voice calls can be substituted for the 4G network 102 within the scope of the disclosure. The legacy network 104 can, for example, be a Universal Mobile Telecommunications System (UMTS) or other 3G network, a Global System for Mobile Communications (GSM) or other 2G network, or other legacy network that can support CS voice calls, but that has lower data rates than the 4G network 102.

The 4G network 102 and legacy network 104 can each have regions of coverage represented by the respective circles illustrated in FIG. 1. The regions of coverage can overlap, such as illustrated by the overlapping portions of the circles in FIG. 1. A wireless communication device in accordance with some example embodiments can operate on both the 4G network 102 and the legacy network 104. Thus, for example, when the wireless communication device is in a region of overlapping coverage, the wireless communication device can be connected to the 4G network 102 with an ongoing data session and can perform a CSFB procedure to the legacy network 104 in response to initiation of a voice call.

Figure 2:
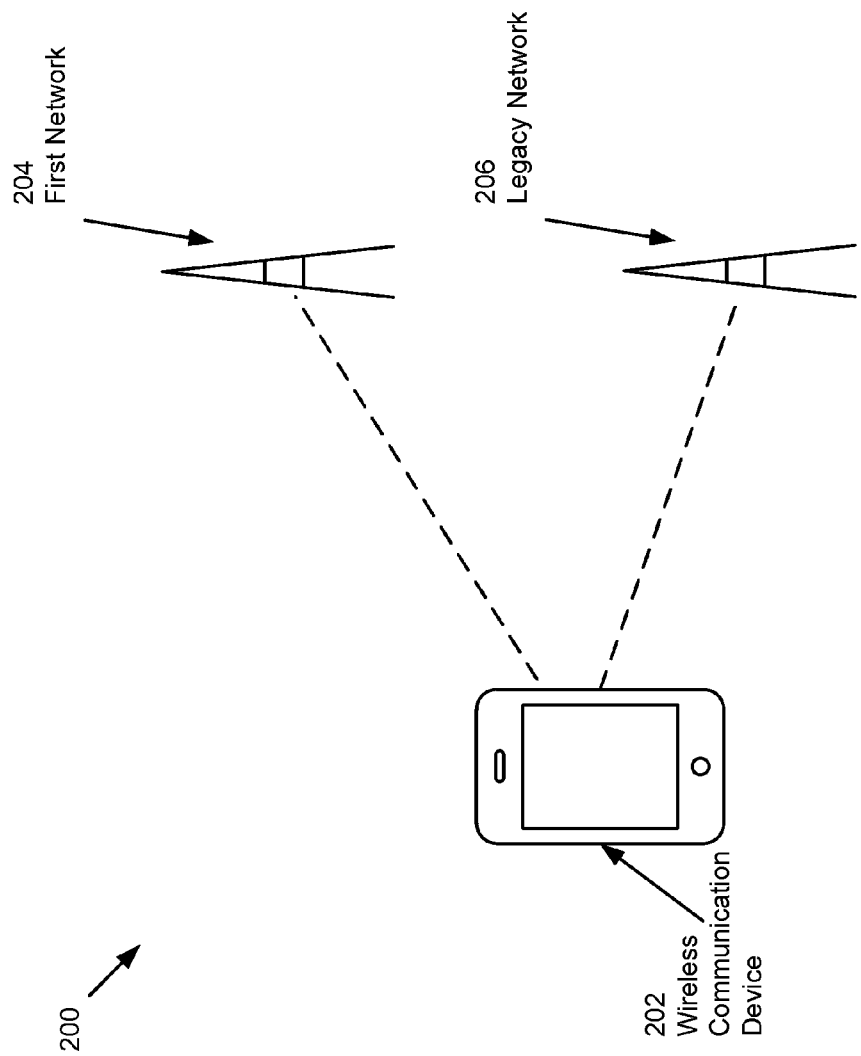
FIG. 2 illustrates an example system having multiple wireless communication networks to which a wireless communication device can connect in accordance with some example embodiments.

FIG. 2 illustrates an example system 200 having multiple wireless communication networks to which a wireless communication device 202 can connect in accordance with some example embodiments. By way of non-limiting example, the wireless communication device 202 can be a cellular phone, such as a smart phone device, a tablet computing device, a laptop computing device, or other computing device configured to operate within both a first network 204 and a legacy network 206. The first network 204 can be any network supporting packet switched (PS) data sessions and offering higher data rates than the legacy network 206, but that does not support CS voice calls. Thus, for example, the first network 204 can be an LTE or other 4G network, such as the 4G network 102 illustrated in FIG. 1. The legacy network 206 can be any network supporting CS voice calls, but that has lower data rates than the first network 204. By way of non-limiting example, the legacy network 206 can be a UMTS or other 3G network, a GSM or other 2G network, or other legacy network that can support CS voice calls, but that has lower data rates than the first network 204. In this regard, the legacy network 206 can be the legacy network 104.

As illustrated in FIG. 2, the wireless communication device 202 can be within signaling range of both a base station or other access point for the first network 204 and a base station or other access point for the legacy network 206. In this regard, the wireless communication device 202 can be located in a region of overlapping coverage of the first network 204 and the legacy network 206. Accordingly, the wireless communication device 202 can connect to the first network 204 and establish a data session, such as by way of non-limiting example, a video call, over the first network 204. In response to initiation of a CS voice call (e.g., a mobile originating voice call initiated by the wireless communication device 202 or a mobile terminating voice call placed to the wireless communication device 202), the wireless communication device 202 can participate in a CSFB procedure to the legacy network 206 so that the voice call can be supported. As a result of the CSFB procedure, the data session can also be moved to the legacy network 206. As such, the data session may be impacted by a lower data rate following the CSFB.

Figure 3:
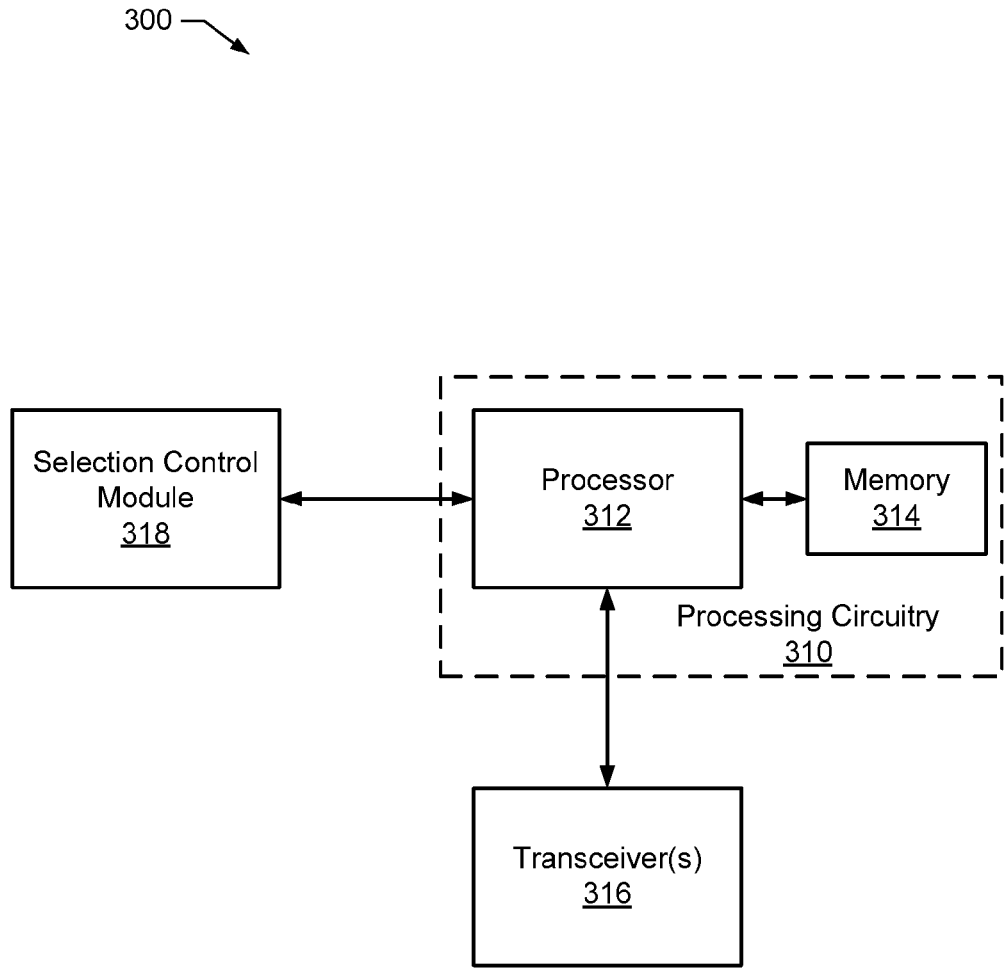
FIG. 3 illustrates a block diagram of an apparatus that can be implemented on a wireless communication device in accordance with some example embodiments.

FIG. 3 illustrates a block diagram of an apparatus 300 that can be implemented on a wireless communication device 202 in accordance with some example embodiments. In this regard, when implemented on a computing device, such as wireless communication device 202, apparatus 300 can enable the computing device to operate within the system 200 in accordance with one or more example embodiments. It will be appreciated that the components, devices or elements illustrated in and described with respect to FIG. 3 below may not be mandatory and thus some may be omitted in certain embodiments. Additionally, some embodiments can include further or different components, devices or elements beyond those illustrated in and described with respect to FIG. 3.

In some example embodiments, the apparatus 300 can include processing circuitry 310 that is configurable to perform actions in accordance with one or more example embodiments disclosed herein. In this regard, the processing circuitry 310 can be configured to perform and/or control performance of one or more functionalities of the apparatus 300 in accordance with various example embodiments, and thus can provide means for performing functionalities of the apparatus 300 in accordance with various example embodiments. The processing circuitry 310 can be configured to perform data processing, application execution and/or other processing and management services according to one or more example embodiments.

In some embodiments, the apparatus 300 or a portion(s) or component(s) thereof, such as the processing circuitry 310, can include one or more chipsets, which can each include one or more chips. The processing circuitry 310 and/or one or more further components of the apparatus 300 can therefore, in some instances, be configured to implement an embodiment on a single chip or chipset. In some example embodiments in which one or more components of the apparatus 300 are embodied as a chipset, the chipset can be capable of enabling a computing device to operate in the system 200 when implemented on or otherwise operably coupled to the computing device. Thus, for example, one or more components of the apparatus 300 can provide a chipset configured to enable a computing device to operate over the first network 204 and/or the legacy network 206.

In some example embodiments, the processing circuitry 310 can include a processor 312 and, in some embodiments, such as that illustrated in FIG. 3, can further include memory 314. The processing circuitry 310 can be in communication with or otherwise control a transceiver(s) 316 and/or selection control module 318.

The processor 312 can be embodied in a variety of forms. For example, the processor 312 can be embodied as various processing means such as a microprocessor, a coprocessor, a controller or various other computing or processing devices including integrated circuits such as, for example, an ASIC (application specific integrated circuit), an FPGA (field programmable gate array), some combination thereof, or the like. Although illustrated as a single processor, it will be appreciated that the processor 312 can comprise a plurality of processors. The plurality of processors can be in operative communication with each other and can be collectively configured to perform one or more functionalities of the apparatus 300 as described herein. In some example embodiments, the processor 312 can be configured to execute instructions that can be stored in the memory 314 or that can be otherwise accessible to the processor 312. As such, whether configured by hardware or by a combination of hardware and software, the processor 312 capable of performing operations according to various embodiments while configured accordingly.

In some example embodiments, the memory 314 can include one or more memory devices. Memory 314 can include fixed and/or removable memory devices. In some embodiments, the memory 314 can provide a non-transitory computer-readable storage medium that can store computer program instructions that can be executed by the processor 312. In this regard, the memory 314 can be configured to store information, data, applications, instructions and/or the like for enabling the apparatus 300 to carry out various functions in accordance with one or more example embodiments. In some embodiments, the memory 314 can be in communication with one or more of the processor 312, transceiver(s) 316, or selection control module 318 via a bus(es) for passing information among components of the apparatus 300.

The apparatus 300 can further include transceiver(s) 316. The transceiver(s) 316 can enable the apparatus 300 to send wireless signals to and receive signals from one or more wireless networks, such as the first network 204 and the legacy network 206. As such, the transceiver(s) 316 can be configured to support any type of cellular or other wireless communication technology that may be implemented by the first network 204 and/or legacy network 206. In some example embodiments, the transceiver(s) 316 can include a single transceiver configured to enable the wireless communication device 202 to connect to both the first network 204 and the legacy network 206. Alternatively, in some example embodiments, the transceiver(s) 316 can include a first transceiver configured to enable the wireless communication device 202 to connect to the first network 204 and a second transceiver configured to enable the wireless communication device 202 to connect to the legacy network 206.

The apparatus 300 can further include selection control module 318. The selection control module 318 can be embodied as various means, such as circuitry, hardware, a computer program product comprising computer readable program instructions stored on a computer readable medium (for example, the memory 314) and executed by a processing device (for example, the processor 312), or some combination thereof. In some embodiments, the processor 312 (or the processing circuitry 310) can include, or otherwise control the selection control module 318.

The selection control module 318 can be configured in some example embodiments to determine that a voice call for which a CSFB procedure had been performed to transition the wireless communication device 202 from the first network 204 to the legacy network 206 has terminated. In an instance in which a data session established on the first network 204 and transitioned to the legacy network 206 as a result of the CSFB is still ongoing after termination of the voice call, the selection control module 318 of some example embodiments can be configured to determine whether sufficient resources are available to the wireless communication device 202 on the legacy network 206 to support a minimum threshold throughput for the data session. The minimum threshold throughput for the data session can, for example, be defined as a minimum throughput needed to provide a threshold quality of service for the data session, a threshold user experience, and/or the like. In some example embodiments, the minimum threshold throughput can be defined as a minimum throughput sufficient to support the data session without the data session being dropped.

Any resource that can be allocated to the wireless communication device 202 by the network or that can depend on a network configuration on the legacy network 206 that can have an affect on throughput can be analyzed to determine if sufficient resources are available to the wireless communication device 202 to support the minimum threshold throughput. For example, the selection control module 318 can examine a serving grant that may have been granted to the wireless communication device 202 by the legacy network 206, an uplink configuration under which the wireless communication device 202 may be operating on the legacy network 206, power headroom available to the wireless communication device 202, and/or other resource that can affect throughput of the data session on the legacy network 206.

If the selection control module 318 determines that sufficient resources are available to the wireless communication device 202 on the legacy network 206, then the selection control module 318 can select to remain connected to the legacy network 206 and continue the data session thereon. However, if the selection control module 318 determines that sufficient resources are not available to the wireless communication device 202 on the legacy network 206, then the selection control module 318 can select to revert to the first network 204 and resume the data session thereon. In this regard, the selection control module 318 can control the wireless communication device 202 to release a connection to the legacy network 206. More particularly, the wireless communication device 202 can send a connection release message to the legacy network 206 in some example embodiments. The connection release message can, for example, be a radio resource control (RRC) signaling connection release message (RRC.connection.release message) that can be sent to the PS domain. After releasing the connection, the selection control module 318 can control the wireless communication device 202 to establish a connection to the first network 204 and resume the data session thereon.

Figure 4:
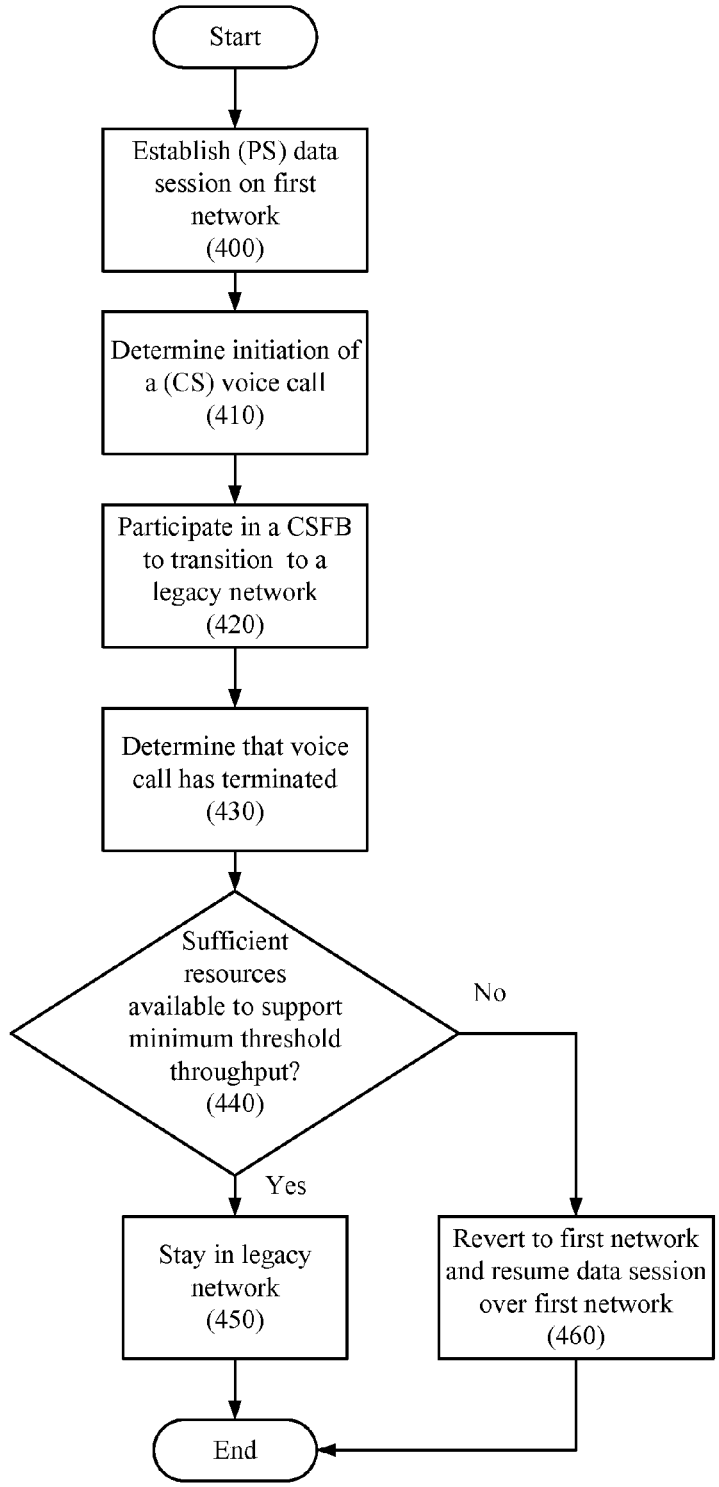
FIG. 4 illustrates a flowchart according to an example method for supporting continuation of a data session after performance of a circuit switched fallback procedure according to some example embodiments.

FIG. 4 illustrates a flowchart according to an example method for supporting continuation of a data session after performance of a circuit switched fallback procedure according to some example embodiments. Operation 400 can include establishing a PS data session on the first network 204. The PS data session can, for example, be a video call, such as a video conferencing session. One or more of processing circuitry 310, processor 312, memory 314, transceiver(s) 316, or selection control module 318 can, for example, provide means for performing operation 400. Operation 410 can include determining initiation of a CS voice call. The voice call can be a mobile originating voice call or a mobile terminating call and can be handled by a CS domain of the core network (CN). One or more of processing circuitry 310, processor 312, memory 314, transceiver(s) 316, or selection control module 318 can, for example, provide means for performing operation 410. Operation 420 can include participating in a CSFB procedure to transition from the first network 204 to the legacy network 206 so that he voice call can be handled by the legacy network 206. One or more of processing circuitry 310, processor 312, memory 314, transceiver(s) 316, or selection control module 318 can, for example, provide means for performing operation 420. Operation 430 can include determining that the voice call has terminated. At this point, the wireless communication device 202 may no longer be a party to a CS voice call that needs to be handled by the legacy network 206. However, the communication device 202 can remain connected to the legacy network 206 with the data session ongoing over the legacy network 206. One or more of processing circuitry 310, processor 312, memory 314, transceiver(s) 316, or selection control module 318 can, for example, provide means for performing operation 430.

Operation 440 can include determining whether sufficient resources are available to the wireless communication device 202 on the legacy network 206 to support a minimum threshold throughput for the data session. One or more of processing circuitry 310, processor 312, memory 314, transceiver(s) 316, or selection control module 318 can, for example, provide means for performing operation 440. In an instance in which it is determined at operation 440 that sufficient resources are available, the method can proceed to operation 450, which can include deciding to remain in the legacy network 206. One or more of processing circuitry 310, processor 312, memory 314, transceiver(s) 316, or selection control module 318 can, for example, provide means for performing operation 450. If, however, it is determined at operation 440 that sufficient resources are not available, the method can proceed to operation 460, which can include reverting to the first network 204 and resuming the data session over the first network 204. One or more of processing circuitry 310, processor 312, memory 314, transceiver(s) 316, or selection control module 318 can, for example, provide means for performing operation 460.

Figure 5:
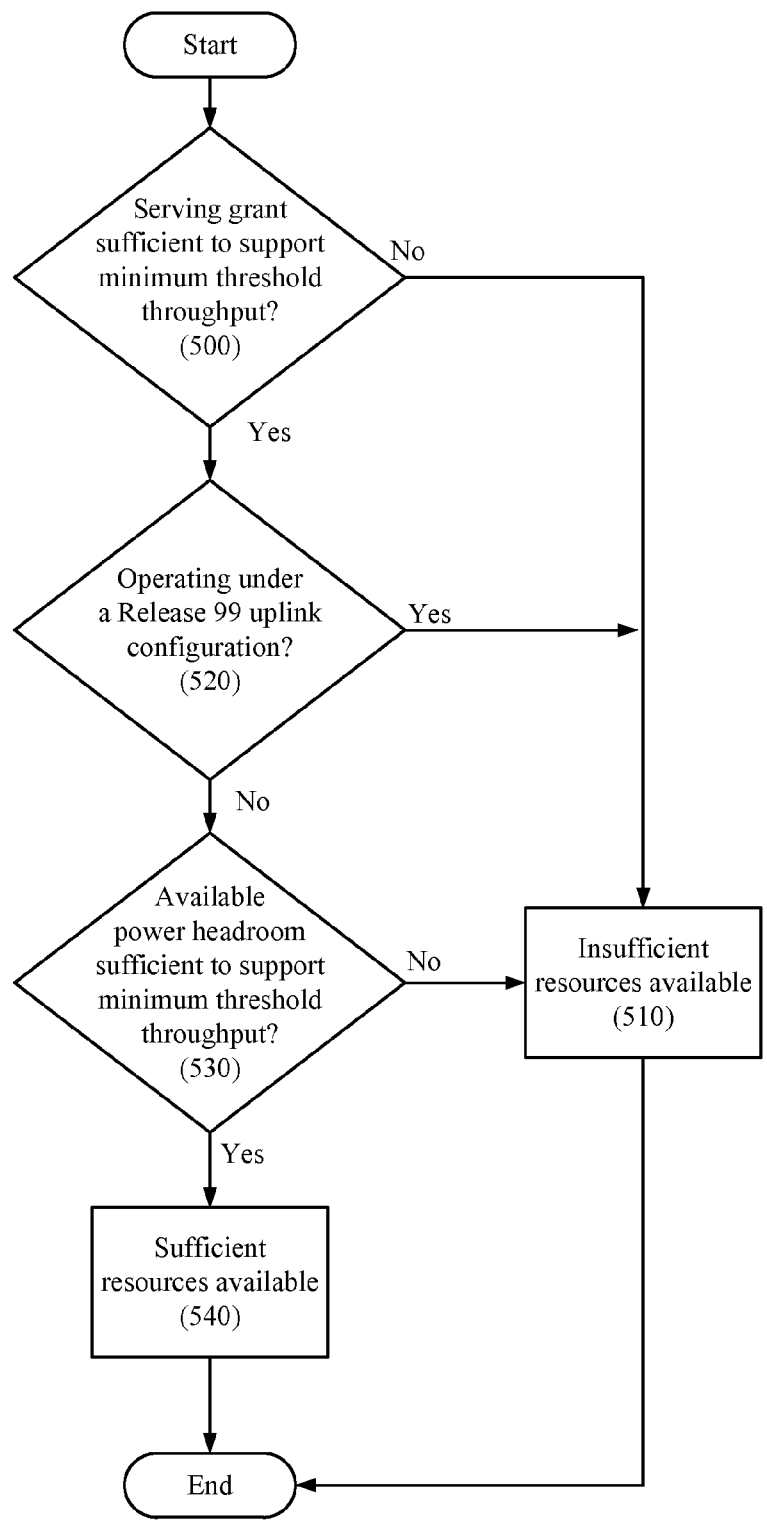
FIG. 5 illustrates a flowchart according to an example method for determining whether sufficient resources are available to a wireless communication device on a legacy network to support a data session according to some example embodiments.

FIG. 5 illustrates a flowchart according to an example method for determining whether sufficient resources are available to a wireless communication device on a legacy network to support a data session according to some example embodiments. In this regard, FIG. 5 illustrates operations that can be performed attendant to performance of operation 440 in some example embodiments. It will be appreciated that operations 500, 520, and 530 can be performed in any order, including concurrently, and, in some example embodiments, one or more of operations 500, 520, and 530 can be omitted. Further, in some example embodiments, one or more further resource checks can be performed attendant to determining whether sufficient resources are available to the wireless communication device 202 on the legacy network 206 to support a minimum threshold throughput for the data session.

With reference to FIG. 5, operation 500 can include determining whether a serving grant that can be granted to the wireless communication device 202 by the legacy network 206 is sufficient to support the minimum threshold throughput. By way of example, operation 500 can include determining that the serving grant is not sufficient to support the minimum threshold throughput in an instance in which a zero grant has been granted to the wireless communication device 202. As a further example, operation 500 can include determining that the serving grant is not sufficient to support the minimum threshold throughput in an instance in which no serving grant has been granted to the wireless communication device 202. As yet another example, operation 500 can include determining that the serving grant is not sufficient to support the minimum threshold throughput in an instance in which a serving grant parameter having a value less than a defined threshold value has been provisioned to the wireless communication device 202 by the legacy network 206. The threshold value can, for example, be 12 and can define a grant providing at least a minimum threshold level of performance and below which the grant is less than needed to support the minimum threshold throughput. As such, operation 500 can include examining a serving grant parameter provisioned by the legacy network 206 and determining whether the serving grant parameter is "0," indicating no grant; is less than a threshold value (e.g., "12"); or is "38," indicating a zero grant. In an instance in which one of these conditions is met, then the method can conclude with operation 510, which can include determining that sufficient resources are not available to support the minimum threshold throughput.

Operation 520 can include examining an uplink configuration under which the wireless communication device 202 can be operating on the legacy network 206 to determine whether the wireless communication device 202 is operating under a Release 99 uplink configuration. If it is determined that the wireless communication device 202 is operating under a Release 99 uplink configuration, then the method can conclude with operation 510, which can include determining that sufficient resources are not available to support the minimum threshold throughput.

Operation 530 can include determining whether an amount of power headroom available to the wireless communication device 202 is sufficient to support the minimum threshold throughput. In this regard, power headroom can be indicative of an amount of throughput that can be available for a data session. For example, available power headroom can indicate that an increase in transmitted power can increase throughput. The amount of power headroom can change depending on many environmental variables that can affect operating conditions of the wireless communication device 202, such as distance to an access point through which the wireless communication device 202 can be accessing the legacy network 204, current power output, and/or the like. If the wireless communication device 202 is already transmitting at a high power, there may be little performance gain from increasing power output. The amount of power headroom considered to be sufficient to support the minimum threshold throughput can, for example, be a configurable amount. Additionally or alternatively, the amount of power headroom considered to be sufficient to support the minimum threshold throughput can be calculated on the basis of requirements of the data session, operating conditions of the wireless communication device 202, and/or other factors. In some instances, it may be determined that there is insufficient available power headroom even if the wireless communication device 202 is sending HAPPY bits indicating that the wireless communication device 202 is satisfied with the current serving grant. In this regard, if the wireless communication device 202 is already transmitting at, or close to a maximum allowable transmit power, then the wireless communication device 202 may not experience sufficient throughput for the data session. For example, the wireless communication device 202 could have been provisioned with a serving grant parameter of "17," which should support a transmission block size (TBS) of 1362 bits, but can be sending data with a significantly lower TBS if transmission power has been maxed out. As another example, if enhanced uplink transmission power has been capped by the legacy network 206, then the wireless communication device 202 may still send Happy bits, but may not have enough available power headroom to send data at a rate to satisfy the minimum threshold throughput. If it is determined that available power headroom is not sufficient to support the minimum threshold throughput, then the method can conclude with operation 510. Otherwise, it may be determined that sufficient resources are available to satisfy the minimum threshold throughput at operation 540.

Figure 6:
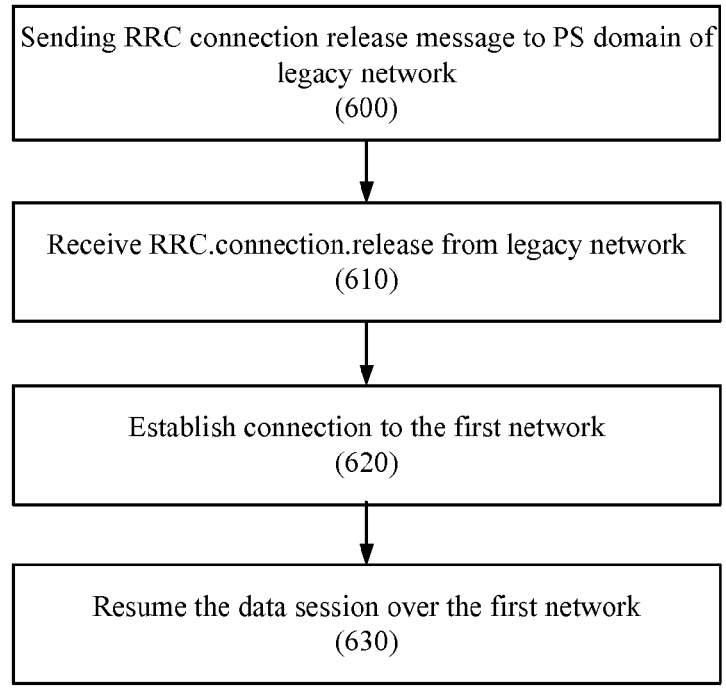
FIG. 6 illustrates a flowchart according to an example method for reverting to a first network from a legacy network according to some example embodiments.

FIG. 6 illustrates a flowchart according to an example method for reverting to the first network 204 from the legacy network 206 according to some example embodiments. In this regard, FIG. 6 illustrates operations that can be performed attendant to performance of operation 460 in some example embodiments. Operation 600 can include sending an RRC connection release message to PS domain of the legacy network 206. Operation 610 can include receiving an RRC.connection.release message from the legacy network 206 in response to the RRC connection release message sent in operation 600. The wireless communication device 202 can then be free to connect to the first network 204. Operation 620 can include establishing a connection to the first network 204. Operation 630 can include resuming the data session over the first network 204.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for supporting continuation of a data session at a wireless communication device after performance of a circuit switched fallback (CSFB) procedure, the method comprising:
    establishing the data session while connected to a Long Term Evolution (LTE) network;
    determining an initiation of a voice call while the data session is ongoing over the LTE network;
    participating in the CSFB procedure to transition from the LTE network to a legacy network in response to determining the initiation of the voice call, wherein the legacy network supports both voice and data communications;
    continuing the data session over the legacy network;
    determining that the voice call has terminated;
    after termination of the voice call, determining whether sufficient resources are available on the legacy network to support a minimum threshold throughput for the data session while the data session is ongoing over the legacy network; and
    reverting to the LTE network in response to determining that sufficient resources are not available to support the minimum threshold throughput.

2. The method of claim 1, further comprising continuing the data session over the legacy network in response to determining that sufficient resources are available to support the minimum threshold throughput.

3. The method of claim 1, wherein the minimum threshold throughput comprises a minimum throughput sufficient to support the data session without the data session being dropped.

4. The method of claim 1, wherein reverting to the LTE network comprises:
    releasing a connection to the legacy network;
    reestablishing a connection to the LTE network; and
    resuming the data session over the LTE network.

5. The method of claim 1, wherein determining that sufficient resources are not available comprises determining that a serving grant granted by the legacy network to the wireless communication device is not sufficient to support the minimum threshold throughput.

6. The method of claim 5, wherein determining that the serving grant is not sufficient to support the minimum threshold throughput comprises determining that:
    i. no serving grant has been granted to the wireless communication device;
    ii. a serving grant parameter having a value of less than a defined threshold value has been granted to the wireless communication device; or
    iii. a zero grant has been granted to the wireless communication device.

7. The method of claim 1, wherein determining that sufficient resources are not available comprises determining that the wireless communication device is operating under a Release 99 uplink configuration allocated by the legacy network.

8. The method of claim 1, wherein determining that sufficient resources are not available comprises determining that power headroom available to the wireless communication device is not sufficient to support the minimum threshold throughput.

9. A wireless communication device comprising:
    at least one transceiver that is configurable to communicate data via a first network and via a second network,
    wherein the first network supports only data communications, and the second network supports both voice and data communications; and
    processing circuitry coupled to the at least one transceiver, the processing circuitry configured to control the wireless communication device to at least:
        establish a data session while the wireless communication device is connected to the first network;
        determine an initiation of a voice call while the data session is ongoing over the first network;
        participate in a circuit switched fallback (CSFB) procedure to transition from the first network to a second network in response to determining the initiation of the voice call;
        continuing the data session over the second network;
        determine that the voice call has terminated;
        after termination of the voice call, determine whether sufficient resources are available on the second network to support a minimum threshold throughput for the data session while the data session is ongoing over the second network;
        revert to the first network when it is determined that sufficient resources are not available to support the minimum threshold throughput; and
        remain connected to the second network when it is determined that sufficient resources are available to support the minimum threshold throughput.

10. The wireless communication device of claim 9, wherein the minimum threshold throughput comprises a minimum throughput sufficient to support the data session without the data session being dropped.

11. The wireless communication device of claim 9, wherein the data session comprises the transfer of video data.

12. The wireless communication device of claim 9, wherein the processing circuitry is further configured to control the wireless communication device to:
    determine whether sufficient resources are available at least in part by examining a serving grant parameter provisioned by the second network; and
    determine whether a serving grant granted by the second network is sufficient to support the minimum threshold throughput based at least in part on a value of the serving grant parameter.

13. The wireless communication device of claim 12, wherein the processing circuitry is further configured to control the wireless communication device to determine that the serving grant is not sufficient to support the minimum threshold throughput when the serving grant parameter has a value indicating that no serving grant has been granted to the wireless communication device or that a zero grant has been granted to the wireless communication device.

14. The wireless communication device of claim 12, wherein the processing circuitry is further configured to control the wireless communication device to determine that the serving grant is not sufficient to support the minimum threshold throughput when the serving grant parameter has a value less than a threshold parameter value granting a serving grant sufficient to support the minimum threshold throughput.

15. The wireless communication device of claim 14, wherein the threshold parameter value is 12.

16. The wireless communication device of claim 9, wherein the processing circuitry is further configured to control the wireless communication device to determine whether sufficient resources are available at least in part by:
    determining whether the wireless communication device is operating under a Release 99 uplink configuration; and
    determining that sufficient resources are not available when it is determined that the wireless communication device is operating under the Release 99 uplink configuration.

17. The wireless communication device of claim 9, wherein the processing circuitry is further configured to control the wireless communication device to determine whether sufficient resources are available at least in part by determining whether power headroom available to the wireless communication device is sufficient to support the minimum threshold throughput.

18. A non-transitory computer-readable medium storing executable instructions for supporting continuation of a data session at a wireless communication device after a circuit switched fallback (CSFB) procedure, that when executed by one or more processors, cause the wireless communication device to:
    establish the data session while connected to a first network;
    determine an initiation of a voice call while the data session is ongoing over the first network;
    participate in the CSFB procedure to transition from the first network to a second network in response to determining the initiation of the voice call,
    wherein the first network supports only data communications, and the second network supports both voice and data communications;
    continue the data session over the second network;
    determine that the voice call has terminated;
    after termination of the voice call, determine whether sufficient resources are available on the second network to support a minimum threshold throughput for the data session while the data session is ongoing over the second network;
    revert to the first network when it is determined that sufficient resources are not available to support the minimum threshold throughput; and
    remain connected to the second network when it is determined that sufficient resources are available to support the minimum threshold throughput.

19. The non-transitory computer-readable medium of claim 18, wherein determining whether sufficient resources are available comprises determining whether a serving grant granted by the second network to the wireless communication device is sufficient to support the minimum threshold throughput.

20. The non-transitory computer-readable medium of claim 18, wherein determining whether sufficient resources are available comprises:
    determining whether the wireless communication device is operating under a Release 99 uplink configuration; and
    determining that sufficient resources are not available in an instance in which it is determined that the wireless communication device is operating under the Release 99 uplink configuration.

21. The non-transitory computer-readable medium of claim 18, wherein determining whether sufficient resources are available comprises determining whether power headroom available to the wireless communication device is sufficient to support the minimum threshold throughput.

22. An apparatus for supporting continuation of a data session at a wireless communication device after performance of a circuit switched fallback (CSFB) procedure, the apparatus comprising processing circuitry configured to at least:
    determine that a voice call for which the CSFB procedure had been performed to transition the wireless communication device from a Long Term Evolution (LTE) network to a legacy network has terminated,
    wherein the legacy network supports both voice and data communications;
    after termination of the voice call, determine whether sufficient resources are available to the wireless communication device on the legacy network to support a minimum threshold throughput for a data session that is ongoing over the legacy network,
    wherein the data session that is ongoing over the legacy network was initially established over the LTE network, prior to the CSFB procedure; and
    control the wireless communication device to revert to the LTE network and resume the data session over the LTE network when it is determined that sufficient resources are not available to support the minimum threshold throughput.

23. The apparatus of claim 22, wherein the apparatus is embodied on a chipset that is configured to enable the wireless communication device to operate over at least one of the LTE network and the legacy network.

24. The apparatus of claim 22, wherein:
    the data session comprises video data; and
    the minimum threshold throughput comprises a minimum throughput sufficient to support a transfer of the video data to the wireless communication device without the video data being dropped.

* * * * *

UNITED STATES PATENT AND TRADEMARK OFFICE
CERTIFICATE OF CORRECTION

PATENT NO.       : 8,890,921 B2  
APPLICATION NO.  : 13/633047  
DATED            : November 18, 2014  
INVENTOR(S)      : Naveen Rawat et al.

Page 1 of 1

It is certified that error appears in the above-identified patent and that said Letters Patent is hereby corrected as shown below:

In the Claims:

Column 12, line 49 (Claim 9, line 18): "continuing" should read --continue--.

Signed and Sealed this  
Third Day of March, 2015

Michelle K. Lee  
*Deputy Director of the United States Patent and Trademark Office*